United States Patent
Pham

[19]

[11] Patent Number: 5,978,314
[45] Date of Patent: Nov. 2, 1999

[54] METHOD FOR DETERMINING SEISMIC VELOCITIES

[75] Inventor: Long Don Pham, Houston, Tex.

[73] Assignee: Exxon Production Research Company, Houston, Tex.

[21] Appl. No.: 08/821,551

[22] Filed: Mar. 21, 1997

[51] Int. Cl.⁶ .................................................. G01V 1/36
[52] U.S. Cl. .................. 367/52; 367/52; 367/38; 367/50; 367/47; 367/51; 364/421
[58] Field of Search ................................. 367/52, 38, 50, 367/47, 51; 364/421

[56] References Cited

U.S. PATENT DOCUMENTS 4,995,007   2/1991   Corcoran et al. .................... 367/52

OTHER PUBLICATIONS

Ozdogan Yilmaz (seismic data processing) pp. 166–180.
William H.Press et al (numerical Recipes in fortran) 1986–1992, pp. 395–399.

*Primary Examiner*—Kamini Shah
*Assistant Examiner*—Anthony Jolly

[57] ABSTRACT

A method for determining a substantially optimal NMO velocity function for use in stacking a CMP gather of seismic data traces. The method begins with an initial estimate of the NMO velocity function for the CMP gather. This initial estimate is typically determined through conventional seismic velocity analysis. The method then picks a first velocity-traveltime pair falling on the initial estimate of the NMO velocity function and conducts a two-dimensional interpolative search of trial velocity-traveltime pairs in the neighborhood of the pick to find a substantially optimal velocity-traveltime pair. This substantially optimal velocity-traveltime pair is the trial velocity-traveltime pair having the highest stack response and is substituted for the pick in the NMO velocity function. The method then proceeds to find substantially optimal velocity-traveltime pairs to replace each of the other picks on the initial estimate of the NMO velocity function. Preferably, the two-dimensional interpolative search consists of a one-dimensional parabolic interpolative search to identify the optimal velocity for each computational time within a specified time window, followed by a one-dimensional search to select one of these optimal velocities which, together with its corresponding computational time, becomes the substantially optimal velocity-traveltime pair for the pick in question.

25 Claims, 7 Drawing Sheets

METHOD FOR DETERMINING SEISMIC VELOCITIES

FIELD OF THE INVENTION

This invention relates generally to the field of seismic prospecting and, more particularly, to seismic data processing. Specifically, the invention is a method for determining seismic velocities for use in common-midpoint stacking of seismic data traces.

BACKGROUND OF THE INVENTION

In the oil and gas industry, seismic prospecting techniques are commonly used to aid in the search for and evaluation of subterranean hydrocarbon deposits. In seismic prospecting, a seismic source is used to generate a seismic signal that propagates into the earth and is at least partially reflected by subsurface seismic reflectors (i.e., interfaces between underground formations having different elastic properties). The reflected signals (known as "seismic reflections") are detected and recorded by seismic receivers located at or near the surface of the earth, in an overlying body of water, or at known depths in boreholes, and the resulting seismic data may be processed to yield information relating to the subsurface formations.

Seismic prospecting consists of three separate stages: data acquisition, data processing, and data interpretation. The success of a seismic prospecting operation depends on satisfactory completion of all three stages.

The seismic energy recorded by each seismic receiver during the data acquisition stage is known as a "seismic data trace". Seismic data traces typically contain both the desired seismic reflections and one or more unwanted noise components which can obscure or overwhelm the seismic reflections. One of the primary objectives of the data processing stage is to remove or at least attenuate these unwanted noise components so that the desired seismic reflections can be clearly identified and interpreted.

One method for attenuating unwanted noise components in seismic data traces is through the common-midpoint (CMP) stacking process. As will be well known to persons skilled in the art, the "midpoint" for a seismic data trace is the point midway between the source location and the receiver location for that trace. According to the CMP method, the recorded seismic data traces are sorted into common-midpoint gathers each of which contains a number of different seismic data traces having the same midpoint but different source-to-receiver offset distances. The seismic data traces within each CMP gather are corrected for statics (i.e., the effects of variations in elevation, weathered layer thickness and/or velocity, or reference datum) and normal moveout (i.e., the variation of traveltime with respect to source-to-receiver offset) and are then summed or "stacked" to yield a stacked data trace which is a composite of the individual seismic data traces in the CMP gather. Typically, the stacked data trace has a significantly improved signal-to-noise ratio compared to that of the unstacked seismic data traces.

As is well known in the art, for a horizontally layered earth having a single horizontal reflector, seismic signal traveltime bears a hyperbolic relation to source-to-receiver offset distance, as follows:

$$t^2 = t_0^2 + \frac{x^2}{V_{NMO}^2} \quad (1)$$

where "t" is the seismic signal traveltime for source-to-receiver offset "x"; "$t_0$" is the seismic signal traveltime for zero offset; and "$V_{NMO}$" is the velocity of the seismic signal (commonly referred to as the "normal-moveout velocity" or "NMO velocity").

In the CMP stacking process, seismic data traces from different source-to-receiver offsets within a CMP gather are stacked by moving them along hyperbolas defined by equation (1) to the zero-offset position and then adding them together. As is well known in the art, the NMO velocity for a CMP gather is not a constant. Typically, the NMO velocity increases sporadically as two-way, zero-offset traveltime increases. For this reason, proper stacking of the seismic data traces within a CMP gather requires knowledge of the NMO velocity as a function of two-way, zero-offset traveltime.

Typically, determination of the NMO velocity function is done manually by expert seismic analysts. One conventional method for determining the NMO velocity function is through the use of velocity spectra. According to this method, the individual seismic data traces in a CMP gather are repeatedly NMO-corrected and stacked using a range of trial velocity values. The resulting stacked traces are then displayed side-by-side on a plane of velocity versus two-way, zero-offset traveltime, known as the "velocity spectrum". The velocity which results in the highest stacked amplitude for a given reflection is selected or "picked" as the NMO velocity for that reflection. The NMO velocity function may then be expressed as a set of velocity-traveltime pairs.

Many other conventional methods for determining or "picking" the NMO velocity function are known. Typically, these methods are based on determining the velocity that corresponds to the best coherency of the signal along a hyperbolic trajectory over the entire CMP gather. Coherency may be measured in a variety of ways, such as an unnormalized crosscorrelation, a normalized crosscorrelation, and energy-normalized crosscorrelation, or semblance (i.e., stack energy normalized by the mean energy of the individual traces going into the stack).

Further information on the use of velocity spectra and other known methods of velocity analysis may be found in Yilmaz, O., *Seismic Data Processing*, 1987, Society of Exploration Geophysicists, Tulsa, Okla., pp. 166–183.

The accuracy of the NMO velocity functions resulting from these prior art methods is limited by the discrete step size used in the set of trial velocity values. As would be well known to persons skilled in the art, manual velocity picking by even the most experienced analyst can only be accurate to within a few percent, and even a small error in the NMO velocity can result in a significant loss in signal-to-noise ratio and bandwidth in the stacked data. Furthermore, the phenomenon of "stretching" (i.e., the change in wavelet shape produced by applying a normal-moveout correction) further degrades the measurement of coherency for the coherency-based methods. Muting can be used to minimize the effects of stretching, but this reduces the fold of the stacking process (i.e., the number of individual traces that contribute to the final stacked trace for the CMP location).

In conventional seismic data processing, the NMO velocity function is determined by a seismic analyst at a plurality of laterally spaced-apart locations along the seismic line.

This is a time consuming process, and, for practical reasons, the number of locations where the NMO velocity function determination is made must be limited. Stacking programs then interpolate these analyst-determined NMO velocity functions to determine the NMO velocity function for each intermediate CMP location.

Even if the analyst-determined NMO velocity functions are correct, it is not certain that the process of interpolation gives the correct NMO velocity function at intermediate CMP locations. Typically, linear interpolation is used. Lateral variations in seismic velocity need not follow a linear variation. Even small errors (e.g., one to two percent) in the NMO velocity function used for stacking can degrade the quality of the stack. This problem would be familiar to persons skilled in the art.

Obviously, it is desirable to have an accurate NMO velocity function for every CMP location along a seismic line. Moreover, given the vast amount of data resulting from a typical three-dimensional (3-D) seismic survey, a method for automatically determining accurate NMO velocity functions is highly desirable.

Prior art attempts to develop automatic methods for determining the NMO velocity function have met with only limited success. In a typical CMP gather, there may be multiple reflections and refractions in addition to the primary reflections of interest. These multiple reflections and refractions may produce spurious peaks in the coherence spectra making it difficult to determine the peak that corresponds to the correct NMO velocity. An experienced seismic analyst often can disregard these spurious peaks and correctly pick the NMO velocity function. However, a completely automatic velocity picking procedure sometimes produces an unsatisfactory solution because the multiple reflections or refractions may have greater energy than the primary reflections of interest.

Some prior art automatic velocity picking procedures attempt to emulate the main criteria followed by seismic analysts by introducing constraints on the allowable interval or stacking velocities. Starting with an initial estimate of the velocity function, a conjugate gradient scheme is used to give an improved estimate of the velocity spectra. As a starting point, this procedure requires computation of the coherency over a range of zero-offset times and velocities for a number of different CMP locations. The choice of the initial estimate can, under certain conditions, lead to different results, and the effects of stretching are present. In any case, the resolution of these automated procedures is no finer than the step size used in the coherency computation.

The prior art also teaches the addition of a penalty function to the conventional coherency measurement; this function penalizes velocity models that differ in smoothness from an initial interval-velocity model. This requires computation of the coherency over a range of zero-offset times and velocities for a number of different CMP locations. The resolution of this method is limited to the interval size used in defining the trial velocities and times, and stretching remains a problem.

Besides the limit in resolution due to the size of the velocity or time step used in the computation, the coherency-based methods are also subject to an additional loss of resolution because the coherency between the traces in a CMP gather is computed over a time window which introduces a smearing of the velocity function. This smearing can be particularly problematic when the window encompasses a strong reflection on the seismic trace. Shifting the center of the window will often produce no discernible change in the coherency value. Shortening the window might appear to be a solution to this problem, but this leads to a serious degradation of the coherency value for weak reflections where the signal-to-noise ratio is low.

If high resolution velocity estimates are desired, they may be obtained by computing the velocity spectra on a fine grid of velocities and times. This increases the computational costs greatly. It is therefore desirable to have a method for automatic velocity picking that has a higher resolution without the computational costs that would be incurred in computing the velocity spectra on a fine grid of velocities and times. One method that has been used in the prior art starts out with a computation of the velocity spectra on a coarse grid. This is followed by a search technique, using steps determined from a Fibonacci series, to compute the coherency at additional trial velocities. The Fibonacci search technique would be familiar to those skilled in the art. By successively reducing the step size, the velocity that gives a maximum of the coherency for a time window is determined. The coherency is calculated only at the velocities determined by the Fibonacci series rather than on a fine grid of velocities between the bounds specified by the analyst. This can lead to a reduction in computation time.

The Fibonacci search method still has the smearing caused by the finite time window, and the effects of stretching are present. In addition, this search technique is strictly one-dimensional, i.e., the zero-offset times are treated independently of each other and without regard to whether in fact there is a reflection within the window.

From the foregoing, it can be seen that an improved method for automatic picking of NMO velocity functions is needed. Such a method should provide for automatic picking of the NMO velocity function for traces within a CMP gather within bounds specified by the analyst. It should also provide a high resolution estimate of the NMO velocity function without an excessive computational burden, and should provide this high resolution estimate without the stretching and smearing introduced by computing the coherency function over a finite time window. The present invention satisfies these needs.

SUMMARY OF THE INVENTION

In one embodiment, the present invention is a method for determining a substantially optimal normal-moveout (NMO) velocity and associated two-way, zero-offset seismic signal traveltime for a designated seismic reflection in a common-midpoint (CMP) gather of seismic data traces. In this embodiment, the method comprises the steps of (a) obtaining initial estimates of the NMO velocity and the two-way, zero-offset seismic signal traveltime for the designated seismic reflection, (b) defining an objective function for use in calculating a stack response for the CMP gather of seismic data traces as a function of a trial velocity and a trial traveltime, (c) defining a time window which includes the initial estimate of the two-way, zero-offset seismic signal traveltime for the designated seismic reflection, (d) defining a velocity range which includes the initial estimate of the NMO velocity for the designated seismic reflection, and (e) performing a two-dimensional interpolative search of trial velocity-traveltime pairs having velocities that fall within the velocity range and traveltimes that fall within the time window and selecting the trial velocity-traveltime pair having the highest stack response as the substantially optimal NMO velocity and associated two-way, zero-offset seismic signal traveltime for the designated seismic reflection.

The initial estimates of the NMO velocity and the two-way, zero-offset seismic signal traveltime for the designated seismic reflection may be obtained through conventional seismic velocity analysis. Alternatively, the initial estimates may be obtained through interpolation from other velocity-traveltime pairs obtained through conventional seismic velocity analysis.

Preferably, the stack response for each trial velocity-traveltime pair is obtained by evaluating the objective function only at points lying on an NMO curve defined by equation (1) above, with $t_0$ and $V_{NMO}$ being equal, respectively, to the time and velocity of the trial velocity-traveltime pair in question. The preferred objective function for use with the present invention is the absolute value of the summation of the seismic data trace amplitudes along the relevant NMO curve. However, other objective functions may be used if desired.

The two-dimensional interpolative search is preferably comprised of a series of one-dimensional searches to determine a substantially optimal velocity for each computational time falling within the time window (i.e., the velocity having the highest stack response for the computational time in question) followed by a search of the resulting substantially optimal velocities to select the single velocity-traveltime pair having the highest stack response. This velocity-traveltime pair is then used as the substantially optimal NMO velocity and associated two-way, zero-offset seismic signal traveltime for the designated seismic reflection. Preferably, the computational times correspond to the times of the data samples falling within the time window. In a preferred embodiment, the one-dimensional search for each computational time is an iterative parabolic interpolation which allows the substantially optimal velocity for the computational time in question to be rapidly identified.

In another embodiment of the invention, the process described above is repeated for other reflections or other two-way, zero-offset traveltimes in the CMP gather to determine a substantially optimal NMO velocity function for the entire gather. This NMO velocity function may then be used for NMO-correcting and stacking the individual seismic data traces in the CMP gather.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents which are included within the spirit and scope of the invention, as defined by the appended claims.

DETAILED DESCRIPTION OF THE PREFERRED EMBODIMENTS

The present invention is a method for determining substantially optimal NMO velocity functions for use in stacking of CMP gathers of seismic data traces. The method may also be used to determine a substantially optimal NMO velocity and a corresponding two-way, zero-offset seismic signal traveltime for a single designated reflection in a CMP gather of seismic data traces. This NMO velocity may then be used to NMO correct the designated reflection prior to stacking.

Preferably, the inventive method is performed automatically using a suitably programmed digital computer. Persons skilled in the art of seismic data processing could easily develop computer software for performing the method based on the teachings set forth herein.

The inventive method begins with an initial estimate of the NMO velocity function for each CMP location. These initial estimates of the NMO velocity function are in the form of a plurality of velocity-traveltime pairs in the order of increasing two-way traveltime for each CMP location. Typically, these initial estimates of the velocity functions would consist of actual values determined by an analyst at a few discrete CMP locations (using any of the conventional prior art techniques discussed above) and interpolated values at intermediate CMP locations. Any type of interpolation may be used.

Figure 1:
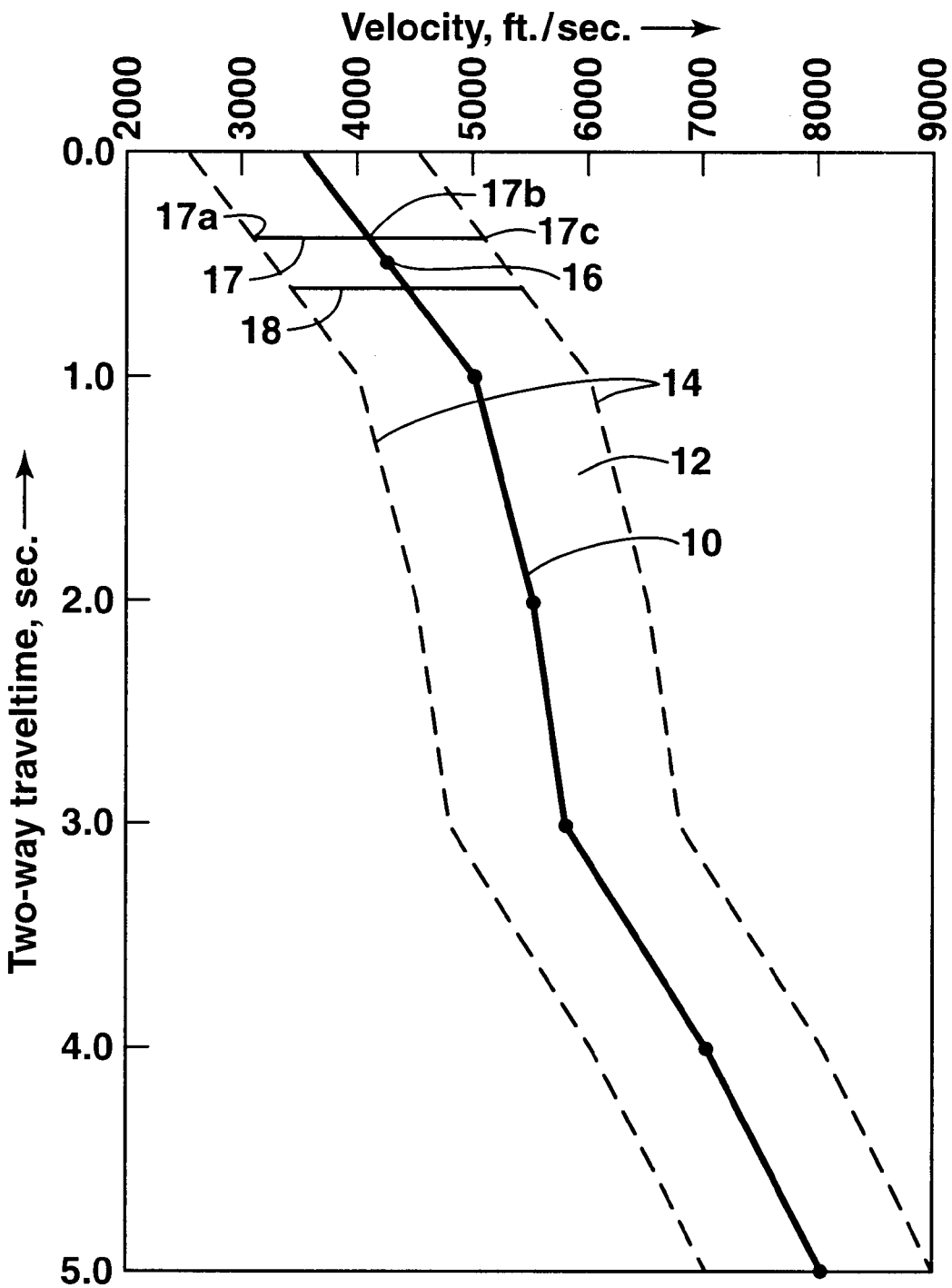
FIG. 1 is a plot of NMO velocity versus two-way, zero-offset seismic signal traveltime for a hypothetical CMP location.

FIG. 1 is a plot of NMO velocity versus two-way, zero-offset seismic signal traveltime for a hypothetical CMP location. The initial estimate 10 of the NMO velocity function for this CMP location was obtained from six velocity-traveltime pairs: (4,250-0.500), (5,000-1.000), (5,500-2.000), (5,750-3.000), (7,000-4.000), (8,000-5.000). As noted above, these six velocity-traveltime pairs may be actual analyst-determined values or interpolated values. Initial estimate 10 assumes that the NMO velocity function varies linearly between consecutive velocity-traveltime pairs.

As described above, the accuracy of the six velocity-traveltime pairs shown in FIG. 1 is suspect, especially if they were obtained by interpolation from other CMP locations. Moreover, the assumption that the NMO velocity function varies linearly between consecutive velocity-traveltime pairs may be incorrect. Therefore, initial estimate 10 is at best an approximation of the actual NMO velocity function for the CMP location.

The present invention may be used to determine a substantially optimal NMO velocity function for the CMP location. The invention assumes that the substantially optimal NMO velocity function lies somewhere within corridor 12 which is defined by boundary lines 14 lying on either side of initial estimate 10. The range of velocities included within corridor 12 may be a constant (as in FIG. 1 where the corridor extends 1,000 ft/sec. on either side of initial estimate 10) or it may be variable. Further, corridor 12 need not be symmetric about initial estimate 10.

Figure 2A:
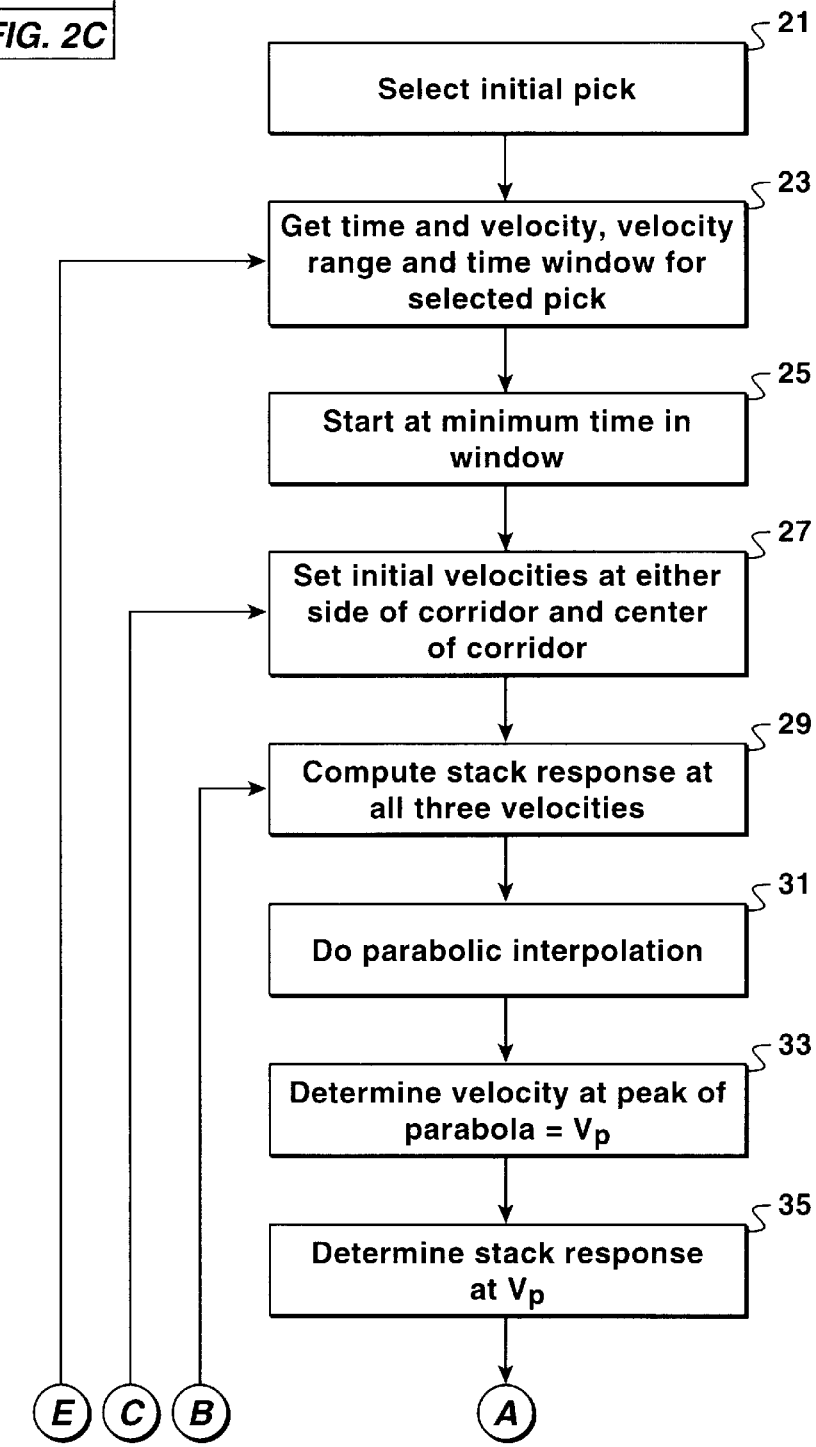
FIGS. 2A, 2B, and 2C are a flow chart showing the primary steps of one embodiment of the present invention.
Figure 2B:
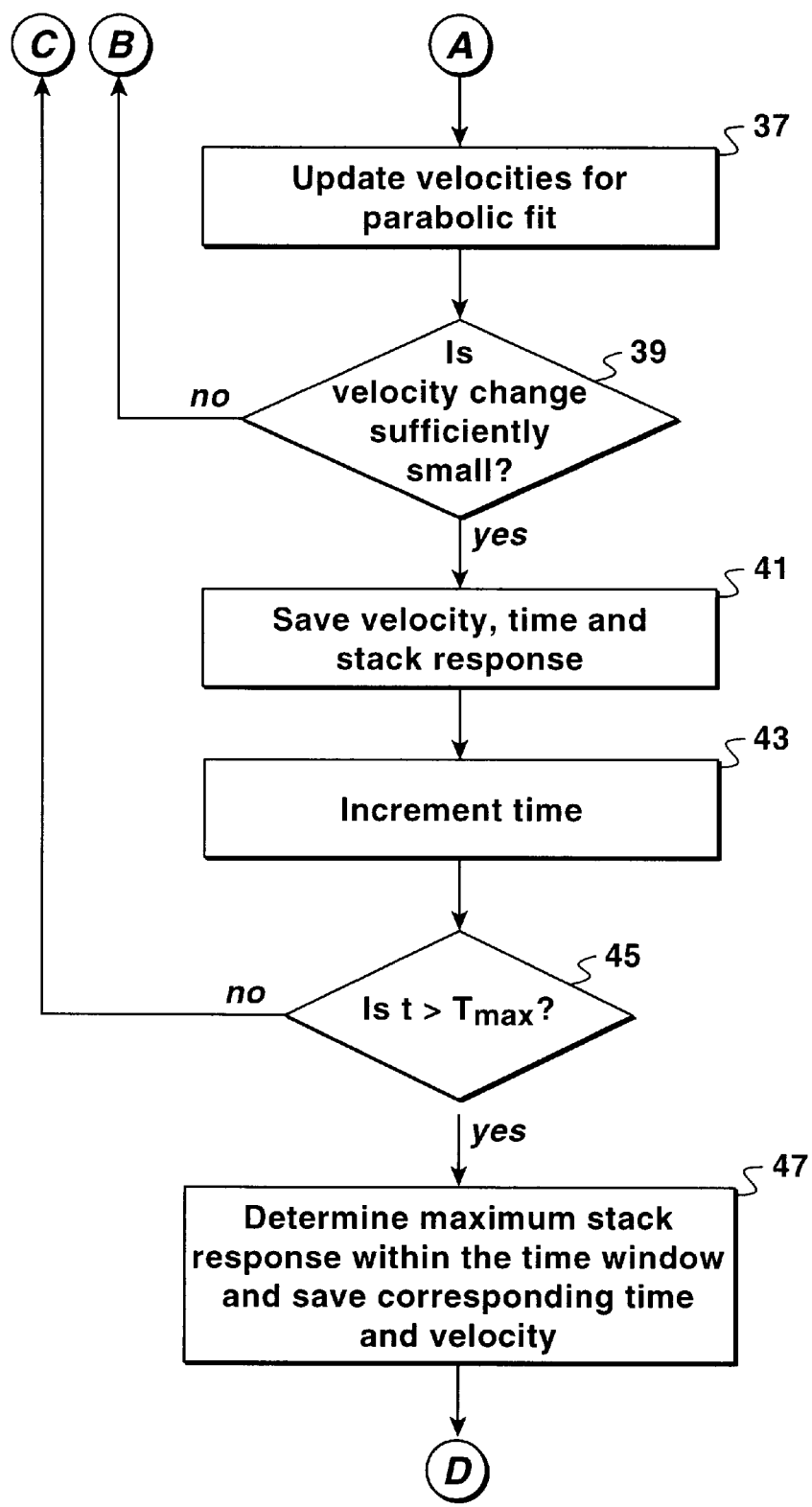
Figure 2C:
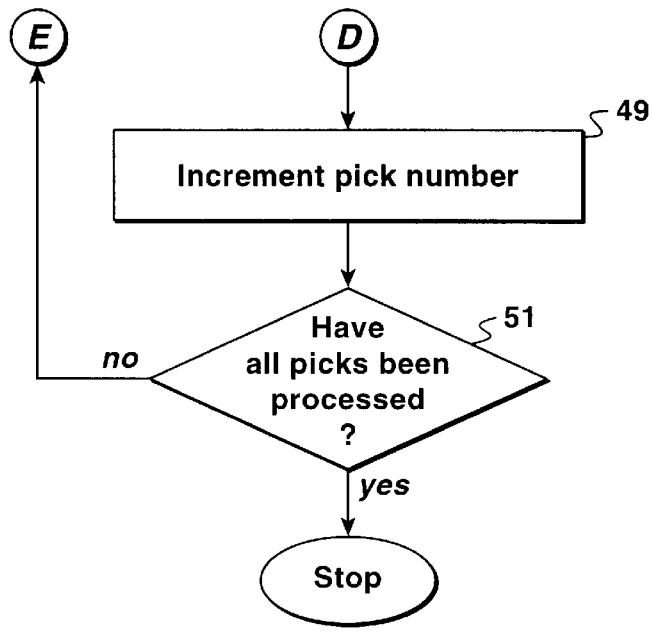

A flowchart for a first embodiment of the invention is set forth in FIGS. 2A, 2B, and 2C. Turning first to FIG. 2A, the inventive method begins at step 21 by selecting a first location or "pick" along initial estimate 10 (e.g., point 16 on FIG. 1 which represents the first of the velocity-traveltime pairs) and setting the pick number to 1. The location selected need not be coincident with any of the velocity-traveltime pairs used to define initial estimate 10; rather, the location selected may be any point on initial estimate 10. The corresponding velocity and traveltime are determined from initial estimate 10. At step 23, the analyst specifies an allowable velocity range and a time window that encompass the selected pick. The time window is defined by a minimum time, $t_{min}$, and a maximum time, $t_{max}$, that encompass the traveltime of the selected pick. These minimum and maximum times are denoted by lines 17 and 18, respectively, in FIG. 1. Preferably, the length of the time window should be approximately equal to the wavelength of the dominant reflection event of interest; however, longer or shorter time windows may be used if desired. The allowable velocity range may be coincident with corridor 12 or, alternatively, may be a constant for the entire time window. Preferably, the allowable velocity range is selected so as to exclude multiple reflection or refraction zones. The inventive method then performs the subsequent steps for a first zero-offset computational time which, preferably, is set at time $t_{min}$. This is depicted at step 25. At step 27, three trial velocities, $V_1$, $V_2$, and $V_3$ are chosen. $V_1$ is the lowest velocity permissible at the selected computational time (e.g., point 17a in FIG. 1), $V_2$ is the predicted NMO velocity at the computational time based on initial estimate 10 (e.g., point 17b in FIG. 1), and $V_3$ is the highest velocity permissible at the computational time (e.g., point 17c in FIG. 1).

Figure 3:
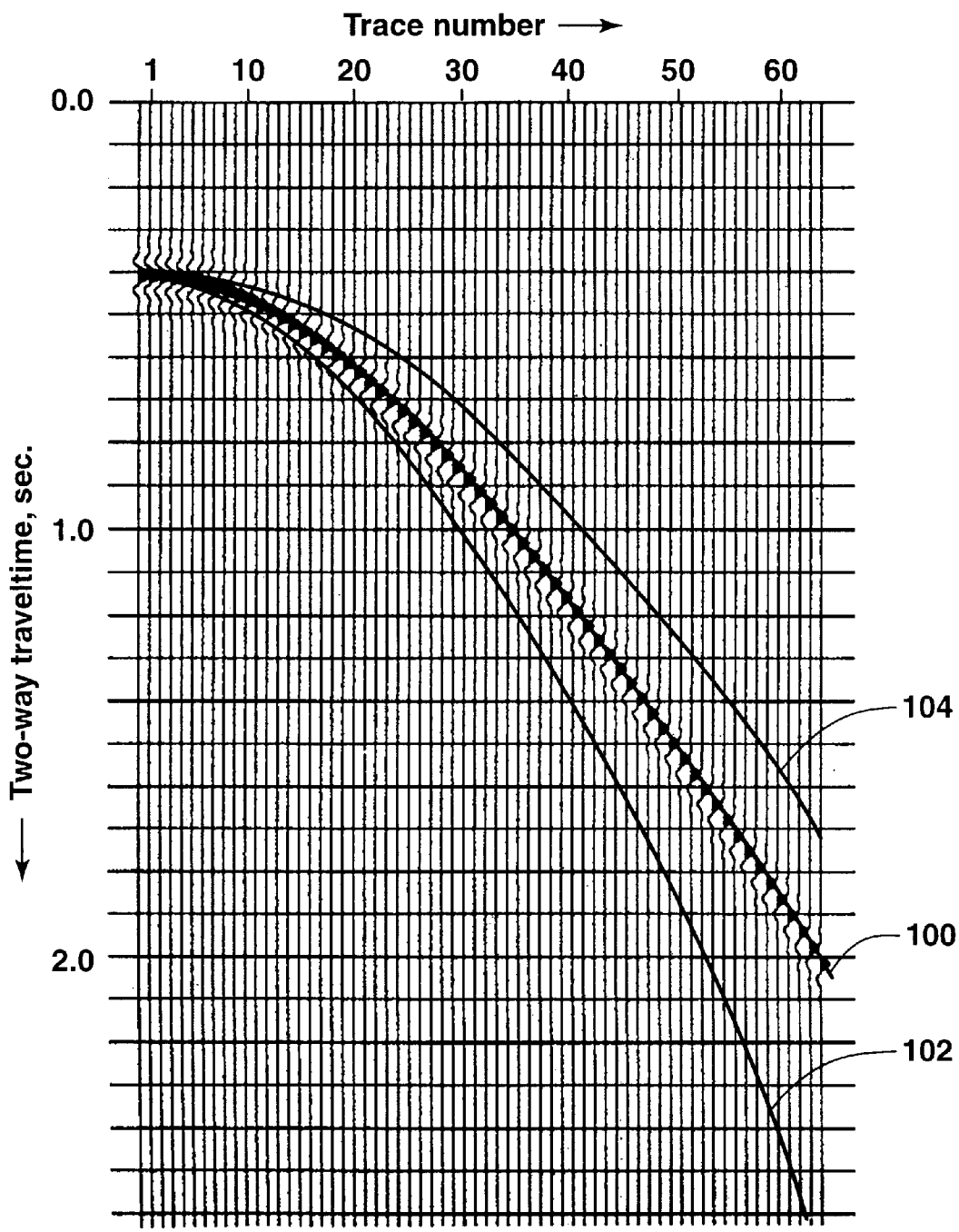
FIG. 3 illustrates a CMP gather for a single horizontal reflector having a two-way, zero-offset seismic signal traveltime of 0.400 seconds.

At step 29, a stack response calculated for each of the three trial velocities. The stack response is calculated along an NMO curve defined by the following equation:

$$t_j = \sqrt{t_0^2 + \frac{x_j^2}{V^2}}, \quad (j = 1, 2, \ldots, N), \tag{1a}$$

where "j" is the trace index within the CMP gather, "N" is the number of traces in the CMP gather, "$t_j$" is the time at which the NMO curve intersects trace j, "$t_0$" is the computational time in question, "$x_j$"; is the offset to trace j, and "V" is the trial velocity. It is this feature of the invention that avoids the stretching and smearing problems inherent in prior art velocity analysis techniques. This feature of the invention may be better understood by referring to FIG. 3 which illustrates a hypothetical CMP gather for a single horizontal reflector having a two-way, zero-offset seismic signal traveltime of 0.400 seconds. The relationship between traveltime and offset is defined by equation (1a). In FIG. 3, NMO curve 100 results from using the correct NMO velocity in equation (1a), while NMO curve 102 results from using a velocity lower than the correct NMO velocity, and NMO curve 104 results from using a velocity higher than the correct NMO velocity.

It is assumed that the trial velocity corresponding to point 17a in FIG. 1 would result in an NMO curve similar to curve 102 in FIG. 3 (i.e., $V_1$ is lower than the actual NMO velocity) and that the trial velocity corresponding to point 17c in FIG. 1 would result in an NMO curve similar to curve 104 (i.e., $V_3$ is higher than the actual NMO velocity). It is unknown, however, whether the trial velocity corresponding to point 17b in FIG. 1 (i.e., $V_2$) is higher than, lower than, or equal to the correct NMO velocity. The stack response calculation in step 29, followed by an iterative parabolic interpolation process in step 31 (to be further described below) permits rapid determination of the correct NMO velocity from the three trial velocities $V_1$, $V_2$, and $V_3$.

As more fully described below, the stack response is calculated using an objective function. Any desired objective function may be used. In a preferred embodiment of the present invention, the objective function used for calculating the stack response is the absolute value of the summation of the individual trace amplitudes taken along the NMO curve for the trial velocity in question, i.e., $$S = \left| \sum_{j=1}^{N} A_j(t_j) \right|, \tag{2}$$

where "S" is the value of the stack response for the trial velocity in question and "$A_j(t_j)$" is the amplitude of trace "j" at time "$t_j$" which is determined according to equation (1a).

Another objective function that could be used for calculating the stack response in the present invention is a conventional semblance measurement, i.e., $$S = \frac{\left( \sum_{j=1}^{N} A_j(t_j) \right)^2}{N \sum_{j=1}^{N} A_j^2(t_j)}, \tag{3}$$

where all variables have the same definitions as set forth above with respect to equations (1a) and (2). Other objective functions which could be used to calculate the stack response in the present invention will be apparent to those skilled in the art. For example, a modified semblance measure in which the crosscorrelation coefficient of every pair of traces in a CMP gather is weighted as a function of trace separation and differences in signal-to-noise ratio could be used.

Calculation of the stack response according to equation (2) is computationally faster than calculation of the stack response according to equation (3). The former requires just the summation of N values whereas the latter has an additional N+1 multiplications and one division. This computational efficiency is one of the primary reasons that equation (2) is the preferred objective function for use in the present invention.

In both equations (2) and (3), the stack response is calculated along a single NMO curve (e.g., curve 100, 102, or 104 in FIG. 3). The amplitude value used in the stack response calculation for each trace in the CMP gather is the value at the specific time given by equation (1a). Thus, it can be seen that calculating the stack response along an incorrect NMO curve (e.g., curve 102 or curve 104) will result in a lower stack response than calculating the stack response along the correct NMO curve (e.g., curve 100). This is in contrast to conventional velocity analysis techniques wherein the value for each trace is measured over a time window, with increased computational burden and loss of resolution. Because the method works with a single data point from each trace, the effects of stretching and smearing are avoided.

In addition, unlike prior art techniques, the stack response is not calculated on a grid. Instead, the stack response is calculated for specific trial velocities. As will be shown below, this leads to a more accurate determination of the velocity at which the stack response attains a peak.

Those skilled in the art would also recognize that the time value given by equation (1a) for a particular trace may not correspond to an exact sample time in the digitized seismic data. Interpolation between adjacent digitized sample values may be used to give the amplitude value used for $A_j(t_j)$ in equations (2) and (3). Any method of interpolation may be used.

As noted above, the invention preferably uses an iterative parabolic interpolation process (step 31 in FIG. 2A) to determine the velocity that gives the maximum value of the stack response. This process is best understood with reference to FIG. 4 in addition to FIGS. 2A and 2B.

Figure 4:
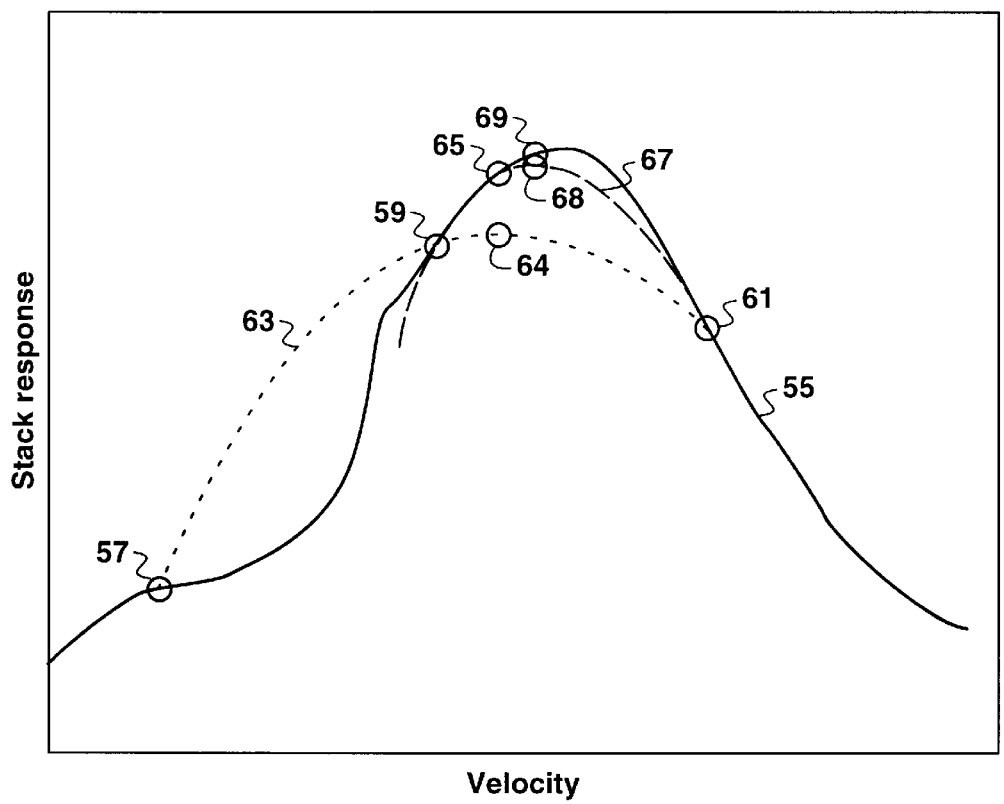
FIG. 4 is a plot of seismic signal velocity versus stack response for a specified traveltime from FIG. 1.

FIG. 4 is a plot of seismic signal velocity versus stack response for a particular computational time (e.g., time 17 in FIG. 1). The stack response is represented by hypothetical curve 55; although persons skilled in the art would readily understand that the actual shape of curve 55 is not known (hypothetical curve 55 is shown for purposes of illustrating the present invention). The purpose of the parabolic interpolation is to determine the peak of the stack response and the corresponding velocity. In a preferred embodiment of the invention, equation (2) is used to calculate the stack response. Following completion of step 29, three values of the stack response, corresponding to the values for $V_1$, $V_2$, and $V_3$ are known. These are represented by points 57, 59, and 61 in FIG. 4. Point 57 corresponds to the stack response at the lower bound of the velocity, $V_1$, at the computational time in question, point 61 corresponds to the stack response at the upper bound of the velocity, $V_3$, at the computational time, and point 59 corresponds to the stack response at the a priori estimate of the NMO velocity, $V_2$. A parabola 63 is then fit through points 57, 59, and 61. The technique for fitting a parabola through three points would be well known to a person skilled in the art and, accordingly, will not be further described herein. Next, at step 33 the invention locates the peak of parabola 63 (represented by point 64 in FIG. 4) and determines the corresponding velocity $V_p$. Next, using equation (1a) in combination with either equation (2) or equation (3), as the case may be, the invention determines the value of the stack response at new trial velocity $V_p$ (step 35 in FIG. 2A). The new stack response value is represented by point 65 on hypothetical stack response curve 55.

Turning now to FIG. 2B, the next step of the inventive method is to determine a new set of trial velocities for the next iteration of the parabolic interpolation. This is shown at step 37. This step is accomplished by checking points 57, 59, and 61 to determine which one has the smallest stack response. In FIG. 4, this happens to be point 57. This point is discarded, and points 59 and 61, together with new point 65, define a new set of velocities for parabolic interpolation. A check is made to see if the velocity corresponding to new point 65 is sufficiently close to the velocity for either point 59 or point 61 so that the parabolic interpolation process may be terminated. The preferred test for closeness is to determine whether the difference between the velocities is within some value specified by the analyst. In a preferred embodiment of the invention, the default value of this test is set at the square root of the computer's floating point accuracy. (This default value depends on the number of bits in a computer word length. As would be well known to persons skilled in the art, this is the smallest meaningful value that could be used.) This is shown at step 39 in FIG. 2B. If the velocity change is not sufficiently small, as determined by this test, the method goes back to step 29 (FIG. 2A) and repeats the parabolic fitting and interpolation procedure. In FIG. 4, this is shown as new parabola 67 that is fit to points 59, 65, and 61. New parabola 67 has a peak at point 68. The velocity at point 68 is then used to determine a new value of the stack response represented by point 69. Point 61 would then be dropped and a new parabola fit through points 59, 65, and 69.

The iterative process of fitting a parabola, determining the velocity at the peak of the parabola, determining the value of the stack response at this velocity, and dropping a point continues until the maximum is isolated to the desired precision. Once this iterative procedure has converged, the resulting velocity and stack response, together with the relevant two-way traveltime, are stored at step 41. The velocity so obtained is defined as the one-dimensional (1-D) substantially optimal velocity and the corresponding stack response as the 1-D substantially optimal stack response. The term "1-D" is used here because at this point the method has considered only a single computational time within the time window specified in step 23. Further information on the parabolic interpolation process may be found in Press, et al., *Numerical Recipes in Fortran: The Art of Scientific Computing*, 2nd ed., 1986, Cambridge University Press, pp. 395–398.

The zero-offset computational time at which the above calculations were performed is then incremented by an amount specified by the analyst. This is shown at step 43 in FIG. 2B. In a preferred embodiment of the invention, the time increment has a default value equal to the digitization interval of the seismic data (i.e., the computational times correspond to the digital sample times of the data). Next, at step 45 a check is made to see if this new computational time is greater than the maximum time for the time window, $t_{max}$ (e.g., time 18 in FIG. 1). If the new computational time is not greater than $t_{max}$, the method goes back to step 27 and repeats the process of determining a 1-D substantially optimal velocity and a 1-D substantially optimal stack response for the new computational time.

If, on the other hand, the incremented time is outside the allowable window, i.e., if the new computational time is greater than $t_{max}$) the method proceeds to step 47. At this point, the method has computed a 1-D substantially optimal velocity and a corresponding 1-D substantially optimal stack response for each computational time within the time window encompassing the specified velocity-traveltime pair (e.g., point 16 in FIG. 1). These 1-D substantially optimal velocities are the result of a one-dimensional search for the velocity that maximizes the stack response at each of the zero-offset computational times. At step 47, the invention determines the maximum stack response within the specified time window and saves the corresponding computational time and 1-D substantially optimal velocity as the substantially optimal stacking velocity in the proximity of the specified velocity-traveltime pair.

The method then increments the pick number by 1, as shown in step 49. If the new pick number is not greater than the maximum number of picks specified by the analyst, a new velocity-traveltime pair is selected and the process of finding the substantially optimal stack response in the vicinity of the selected velocity-traveltime pair is repeated, starting from step 23 and proceeding through step 47. Once all the picks have been processed, the method proceeds on to the next CMP gather.

As noted above, in another embodiment the present invention is a method for determining a substantially optimal NMO velocity and a corresponding two-way, zero-offset seismic signal traveltime for a single designated reflection in a CMP gather. In this embodiment, there is only one pick to be processed (i.e., the initial estimate of the NMO velocity and two-way, zero-offset seismic signal traveltime for the reflection in question). Accordingly, in this embodiment, steps 49 and 51 are omitted and the method concludes after completing step 47.

It will be clear that this process of finding the time and velocity at which the stack response is largest is equivalent to finding a pick corresponding to the strongest amplitude reflection event in the vicinity of the specified velocity-traveltime pair. The resolution of the pick obtained by this invention is one digitization interval in time and the aforesaid velocity accuracy. Starting with an initial estimate of the velocity function at a sparse set of CMP locations, using this method, it is possible to obtain substantially optimal NMO velocity functions at every CMP location on a seismic line with little further involvement of the analyst.

Figure 5A:
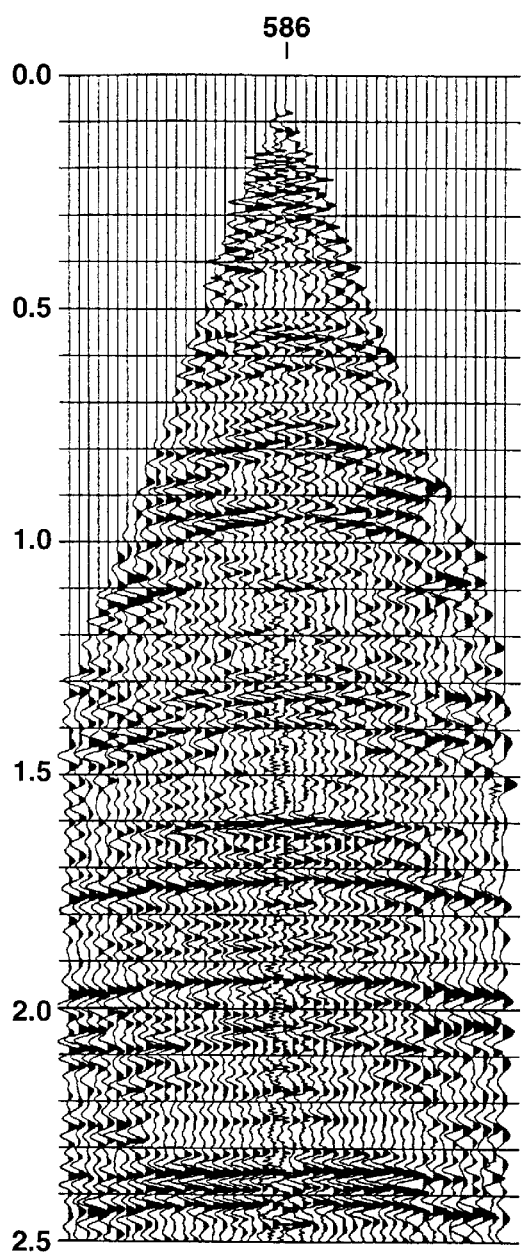
FIG. 5A shows data from an actual CMP gather that have been corrected for normal moveout using a normal moveout velocity function obtained by conventional velocity analysis.
Figure 5B:
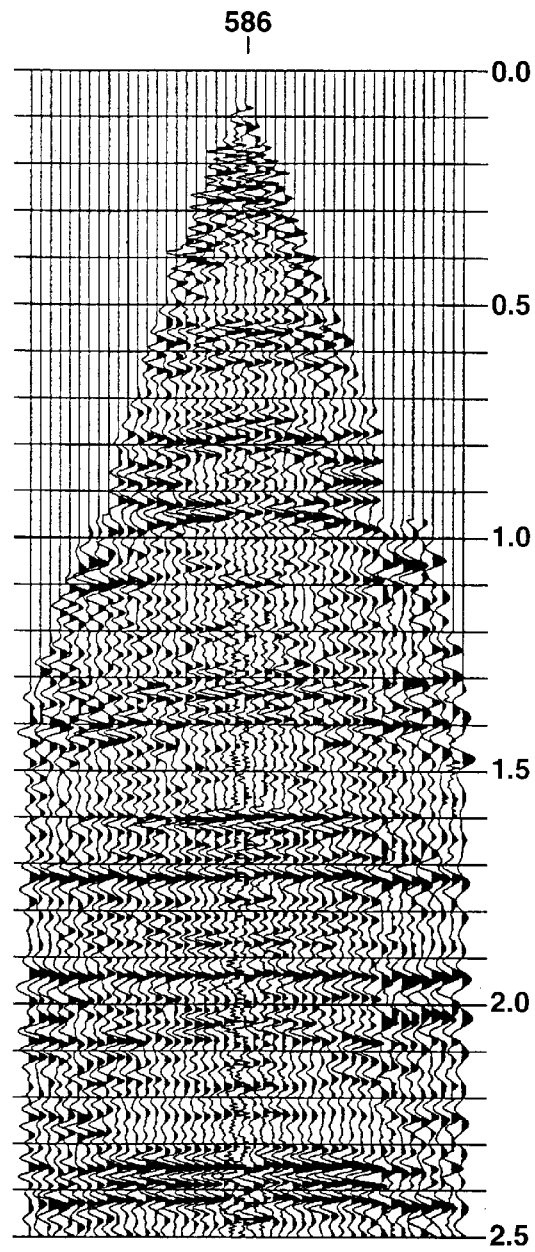
FIG. 5B shows the data of FIG. 5A after application of the present invention.

The advantages of the present invention will be illustrated with respect to FIGS. 5A, 5B, 6A, and 6B. FIGS. 5A and 5B show data from a CMP gather that have been corrected for normal moveout. FIG. 5A used a velocity function obtained by the conventional step of interpolating between velocity functions specified by an analyst at selected locations. This same velocity function was then used as a starting point for the present invention and an improved NMO velocity function was obtained. This improved NMO velocity function was used to produce the CMP gather in FIG. 5B. Obviously, the CMP gather in FIG. 5B is substantially better than the CMP gather in FIG. 5A. For example, the strong reflection between 1.7 and 1.8 seconds has been flattened much better in FIG. 5B than in FIG. 5A.

Figure 6B:
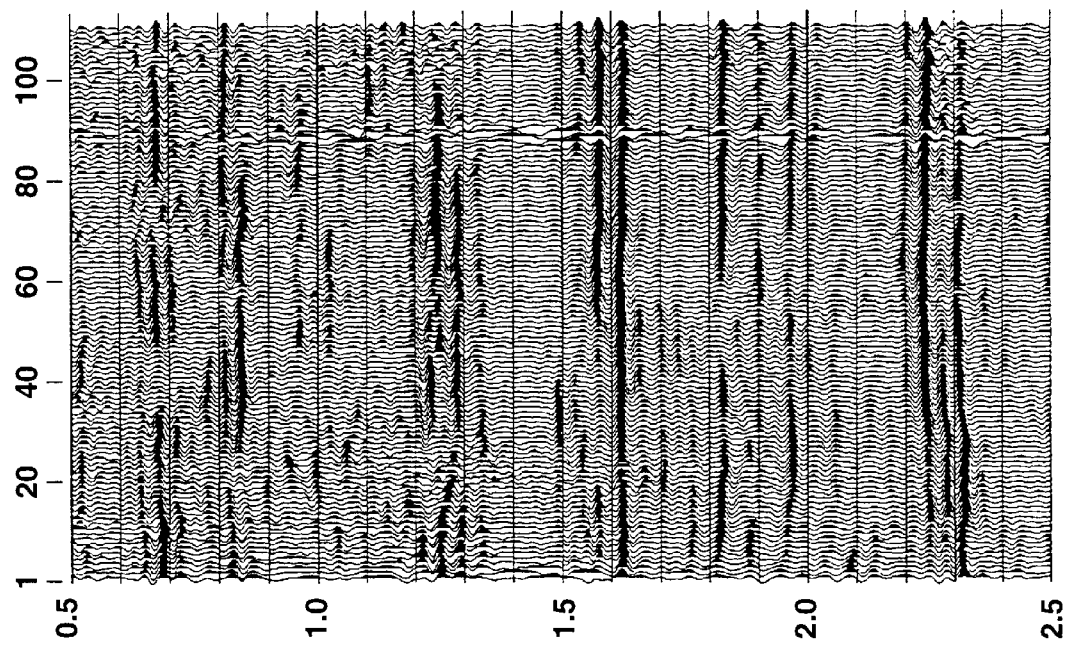
FIG. 6B shows the stacked seismic section of FIG. 6A after application of the present invention.
Figure 6A:
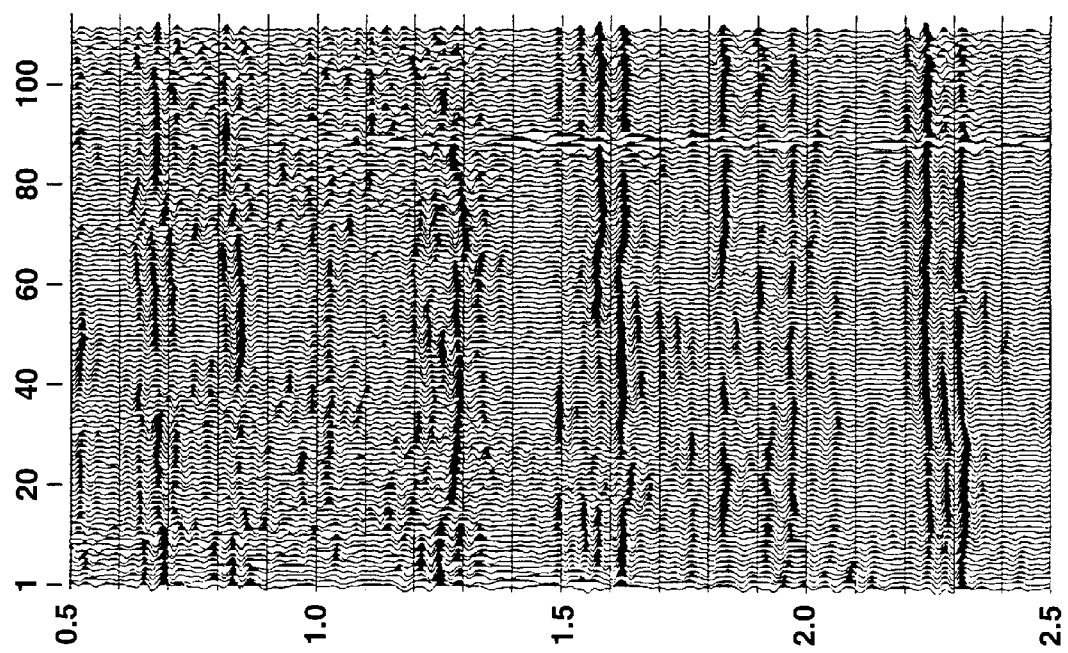
FIG. 6A shows a stacked seismic section resulting from conventional seismic data processing using a normal moveout velocity function obtained by conventional velocity analysis.

FIGS. 6A and 6B show a similar comparison for a line of seismic data. FIG. 6A is the stacked section obtained by conventional seismic processing in which the NMO velocity function was picked by an analyst at a limited number of CMP locations. These same velocity functions were used as an input to the present invention to obtain a stacking velocity function at every CMP location on the line and these were then used to stack the entire line. The stacked section resulting from application of the present invention is shown in FIG. 6B. Again, it can be seen that the present invention results in a much improved stacked section.

The present invention is subject to variations, modifications, and changes in detail, and it is therefore intended that all subject matter described above and shown in the accompanying drawings be interpreted as illustrative only and not as limiting the scope of the invention. For example, it would be possible to start with a set of picks and a corridor, perform a parabolic interpolative search over time for a fixed velocity, determine a maximum stack response for this velocity, and then search over a range of velocities to give a local maximum near the analyst-specified pick. All such variations, modifications, and changes in detail are included within the scope of the invention, as defined by the following claims.

I claim:

1. A method for determining a substantially optimal normal-moveout (NMO) velocity and associated two-way, zero-offset seismic signal traveltime for a designated seismic reflection in a common-midpoint (CMP) gather of seismic data traces, said method comprising the steps of:

(a) obtaining initial estimates of said NMO velocity and said two-way, zero-offset seismic signal traveltime for said designated seismic reflection;

(b) defining an objective function for use in calculating a stack response for said CMP gather of seismic data traces as a function of a trial velocity and a trial traveltime;

(c) defining a time window which includes said initial estimate of said two-way, zero-offset seismic signal traveltime for said designated seismic reflection;

(d) defining a velocity range which includes said initial estimate of said NMO velocity for said designated seismic reflection; and (e) performing a two-dimensional interpolative search of trial velocity-traveltime pairs having velocities that fall within said velocity range and traveltimes that fall within said time window and selecting the trial velocity-traveltime pair having the highest stack response as said substantially optimal NMO velocity and associated two-way, zero-offset seismic signal traveltime for said designated seismic reflection.

2. The method of claim 1, wherein said initial estimates of said NMO velocity and said two-way, zero-offset seismic signal traveltime for said designated seismic reflection are obtained through conventional seismic velocity analysis.

3. The method of claim 1, wherein said initial estimates of said NMO velocity and said two-way, zero-offset seismic signal traveltime for said designated seismic reflection are obtained through interpolation from other velocity-traveltime pairs obtained through conventional seismic velocity analysis.

4. The method of claim 1, wherein said stack response for each of said trial velocity-traveltime pairs is obtained by evaluating said objective function only at points lying on an NMO curve defined by the following equation:

$$t_j = \sqrt{t_0^2 + \frac{x_j^2}{V^2}}, \qquad (j = 1, 2, \ldots, N),$$

where "j" is the trace index within said CMP gather, "N" is the number of traces in said CMP gather, "$t_j$" is the time at which said NMO curve intersects trace j, "$t_0$" is the time of said trial velocity-traveltime pair, "$x_j$" is the offset to trace j, and "V" is the velocity of said trial velocity-traveltime pair.

5. The method of claim 4, wherein said objective function for use in calculating said stack response is:

$$S = \left| \sum_{j=1}^{N} A_j(t_j) \right|,$$

where "S" is the stack response and "$A_j(t_j)$" is the amplitude of trace j at time $t_j$.

6. The method of claim 4, wherein said objective function for use in calculating said stack response is:

$$S = \frac{\left( \sum_{j=1}^{N} A_j(t_j) \right)^2}{N \sum_{j=1}^{N} A_j^2(t_j)},$$

where "S" is the stack response and "$A_j(t_j)$" is the amplitude of trace j at time $t_j$.

7. The method of claim 1, wherein said time window contains a plurality of discrete computational times, and wherein said two-dimensional interpolative search further comprises the steps of:

(a) for each computational time within said time window, performing a one-dimensional interpolative search of trial velocities that fall within said velocity range and selecting the trial velocity having the highest stack response as the substantially optimal velocity for said computational time;

(b) determining which of said substantially optimal velocities determined in step (a) has the highest stack response; and (c) selecting said substantially optimal velocity having the highest stack response and the corresponding computational time as said substantially optimal NMO velocity and associated two-way, zero-offset seismic signal traveltime for said designated seismic reflection.

8. The method of claim 7, wherein said seismic data traces are digitally sampled data traces, and wherein said computational times correspond to the times of data samples falling within said time window.

9. The method of claim 7, wherein said one-dimensional interpolative search is an iterative parabolic interpolation.

10. A method for determining the normal-moveout (NMO) velocity function for a common-midpoint (CMP) gather of seismic data traces, said method comprising the steps of:

(a) obtaining an initial estimate of said NMO velocity function, said initial estimate consisting of a plurality of velocity-traveltime pairs;

(b) defining an objective function for use in calculating a stack response for said CMP gather of seismic data traces as a function of a trial velocity and a trial traveltime;

(c) selecting a first one of said velocity-traveltime pairs and performing an optimization procedure comprising the steps of
  (i) defining a time window which includes the traveltime of said selected velocity-traveltime pair,
  (ii) defining a velocity range which includes the velocity of said selected velocity-traveltime pair,
  (iii) performing a two-dimensional interpolative search of trial velocity-traveltime pairs having velocities that fall within said velocity range and traveltimes that fall within said time window to find a substantially optimal velocity-traveltime pair, said substantially optimal velocity-traveltime pair being the trial velocity-traveltime pair having the largest stack response, and
  (iv) substituting said substantially optimal velocity-traveltime pair for said selected velocity-traveltime pair in said NMO velocity function; and (d) repeating step (c) for each other velocity-traveltime pair in said initial estimate of said NMO velocity function.

11. The method of claim 10, wherein said initial estimate of said NMO velocity function is obtained through conventional seismic velocity analysis.

12. The method of claim 10, wherein said initial estimate of said NMO velocity function is obtained through interpolation from other velocity-traveltime pairs obtained through conventional seismic velocity analysis.

13. The method of claim 10, wherein said stack response for each of said trial velocity-traveltime pairs is obtained by evaluating said objective function only at points lying on an NMO curve defined by the following equation:

$$t_j = \sqrt{t_0^2 + \frac{x_j^2}{V^2}}, \qquad (j = 1, 2, \ldots, N),$$

where "j" is the trace index within said CMP gather, "N" is the number of traces in said CMP gather, "$t_j$" is the time at which said NMO curve intersects trace j, "$t_0$" is the time of said trial velocity-traveltime pair, "$x_j$" is the offset to trace j, and "V" is the velocity of said trial velocity-traveltime pair.

14. The method of claim 13, wherein said objective function for use in calculating said stack response is:

$$S = \left| \sum_{j=1}^{N} A_j(t_j) \right|,$$

where "S" is the stack response and "$A_j(t_j)$" is the amplitude of trace j at time $t_j$.

15. The method of claim 13, wherein said objective function for use in calculating said stack response is:

$$S = \frac{\left( \sum_{j=1}^{N} A_j(t_j) \right)^2}{N \sum_{j=1}^{N} A_j^2(t_j)},$$

where "S" is the stack response and "$A_j(t_j)$" is the amplitude of trace j at time $t_j$.

16. The method of claim 10, wherein said time window contains a plurality of discrete computational times, and wherein said two-dimensional interpolative search further comprises the steps of:

(a) for each computational time within said time window, performing a one-dimensional interpolative search of trial velocities that fall within said velocity range and selecting the trial velocity having the highest stack response as the substantially optimal velocity for said computational time;

(b) determining which of said substantially optimal velocities determined in step (a) has the highest stack response; and (c) designating said substantially optimal velocity having the highest stack response and the corresponding computational time as said substantially optimal velocity-traveltime pair.

17. The method of claim 16, wherein said seismic data traces are digitally sampled data traces, and wherein said computational times correspond to the times of data samples falling within said time window.

18. The method of claim 16, wherein said one-dimensional interpolative search is an iterative parabolic interpolation.

19. A method for normal-moveout (NMO) correcting a designated seismic reflection in a common-midpoint (CMP) gather of seismic data traces, said method comprising the steps of:

(a) obtaining initial estimates of the NMO velocity and the two-way, zero-offset seismic signal traveltime for said designated seismic reflection;

(b) defining an objective function for use in calculating a stack response for said CMP gather of seismic data traces as a function of a trial velocity and a trial traveltime;

(c) defining a time window which includes said initial estimate of the two-way, zero-offset seismic signal traveltime for said designated seismic reflection;

(d) defining a velocity range which includes said initial estimate of the NMO velocity for said designated seismic reflection;

(e) performing a two-dimensional interpolative search of trial velocity-traveltime pairs having velocities that fall within said velocity range and traveltimes that fall within said time window to identify a substantially optimal velocity-traveltime pair, said substantially optimal velocity-traveltime pair being the trial velocity-traveltime pair having the highest stack response; and (f) using said substantially optimal velocity-traveltime pair as the NMO velocity and the two-way, zero-offset seismic signal traveltime for NMO correcting said designated seismic reflection.

20. The method of claim 19, wherein said stack response for each of said trial velocity-traveltime pairs is obtained by evaluating said objective function only at points lying on an NMO curve defined by the following equation:

$$t_j = \sqrt{t_0^2 + \frac{x_j^2}{V^2}}, \qquad (j = 1, 2, \ldots, N),$$

where "j" is the trace index within said CMP gather, "N" is the number of traces in said CMP gather, "$t_j$" is the time at which said NMO curve intersects trace j, "$t_0$" is the time of said trial velocity-traveltime pair, "$x_j$" is the offset to trace j, and "V" is the velocity of said trial velocity-traveltime pair.

21. The method of claim 20, wherein said objective function for use in calculating said stack response is:

$$S = \left| \sum_{j=1}^{N} A_j(t_j) \right|,$$

where "S" is the stack response and "$A_j(t_j)$" is the amplitude of trace j at time $t_j$.

22. The method of claim 20, wherein said objective function for use in calculating said stack response is:

$$S = \frac{\left( \sum_{j=1}^{N} A_j(t_j) \right)^2}{N \sum_{j=1}^{N} A_j^2(t_j)},$$

where "S" is the stack response and "$A_j(t_j)$" is the amplitude of trace j at time $t_j$.

23. The method of claim 19, wherein said time window contains a plurality of discrete computational times, and wherein said two-dimensional interpolative search further comprises the steps of:

(a) for each computational time within said time window, performing a one-dimensional interpolative search of trial velocities that fall within said velocity range and selecting the trial velocity having the highest stack response as the substantially optimal velocity for said computational time;

(b) determining which of said substantially optimal velocities determined in step (a) has the highest stack response; and (c) designating said substantially optimal velocity having the highest stack response and the corresponding computational time as said substantially optimal velocity-traveltime pair.

24. The method of claim 23, wherein said seismic data traces are digitally sampled data traces, and wherein said computational times correspond to the times of data samples falling within said time window.

25. The method of claim 23, wherein said one-dimensional interpolative search is an iterative parabolic interpolation.

* * * * *